United States Patent
Comeau et al.

(10) Patent No.: US 10,108,457 B2
(45) Date of Patent: *Oct. 23, 2018

(54) METHOD AND SYSTEM FOR WIRELESS COMMUNICATION BASEBAND PROCESSING

(71) Applicant: Telefonaktiebolaget LM Ericsson (publ), Stockholm (SE)

(72) Inventors: Adrien Joseph Comeau, Ottawa (CA); Peter Malcolm Coe, Ottawa (CA); Gregory Allan Osborne, Ottawa (CA); Gary David Boudreau, Kanata (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 176 days.

This patent is subject to a terminal disclaimer.

(21) Appl. No.: 15/090,079

(22) Filed: Apr. 4, 2016

(65) Prior Publication Data
US 2016/0217012 A1  Jul. 28, 2016

Related U.S. Application Data

(63) Continuation of application No. 13/217,824, filed on Aug. 25, 2011, now Pat. No. 9,380,597.

(51) Int. Cl.
*G06F 9/50* (2006.01)
*H04W 72/12* (2009.01)
(Continued)

(52) U.S. Cl.
CPC .......... *G06F 9/5038* (2013.01); *G06F 9/4881* (2013.01); *G06F 9/5083* (2013.01); *H04W 72/1257* (2013.01); *H04W 88/08* (2013.01)

(58) Field of Classification Search
CPC .. H04W 72/1257; H04W 88/08; G06F 9/4881
See application file for complete search history.

(56) References Cited

U.S. PATENT DOCUMENTS 6,338,130 B1  1/2002  Sinibaldi et al.
6,567,840 B1 * 5/2003  Binns .................... G06F 9/4887
                                                   718/100

(Continued)

FOREIGN PATENT DOCUMENTS

EP    1 672 852 A2    6/2006
WO   2005032056 A2    4/2005
WO   2005032181 A1    4/2005

OTHER PUBLICATIONS

Yu_et al—A Single Envelope Modulator-Based Envelope-Tracking Structure for Multiple-Input and Multiple-Output Wireless Transmitters, Published in: IEEE Transactions on Microwave Theory and Techniques (vol. 60 (10):3317-3327 Aug. 3, 2012 consisting of 11-pages.

(Continued)

*Primary Examiner* — Xavier Szewai Wong
(74) *Attorney, Agent, or Firm* — Sage Patent Group

(57) ABSTRACT

A method and system for prioritized baseband processing in a wireless communication network is disclosed. Parameters affecting processing times for performing tasks associated with different user equipments are evaluated and the tasks are prioritized based on the evaluation. Each task is performed by the baseband processor at a time that is based on the priority assigned to the task.

15 Claims, 4 Drawing Sheets

(51) Int. Cl.
 *H04W 88/08* (2009.01)
 *G06F 9/48* (2006.01)

(56) References Cited

U.S. PATENT DOCUMENTS

| | | | |
|---|---|---|---|
| 8,538,482 B2 | 9/2013 | Koo et al. | |
| 8,576,692 B2* | 11/2013 | Zhang | H04L 5/0051 370/208 |
| 8,705,368 B1* | 4/2014 | Abts | H04L 47/10 370/238 |
| 9,380,597 B2* | 6/2016 | Comeau | G06F 9/4881 |
| 2004/0054998 A1* | 3/2004 | Hayashi | G06F 9/4887 718/102 |
| 2004/0258070 A1 | 12/2004 | Arima | |
| 2006/0126559 A1 | 6/2006 | Jun et al. | |
| 2006/0187844 A1 | 8/2006 | Chun et al. | |
| 2008/0080399 A1 | 4/2008 | Wang et al. | |
| 2008/0168465 A1 | 7/2008 | Tanaka | |
| 2008/0184241 A1 | 7/2008 | Headrick et al. | |
| 2008/0192622 A1* | 8/2008 | Scheim | H04L 1/0025 370/210 |
| 2009/0047976 A1 | 2/2009 | Fujii et al. | |
| 2010/0095183 A1 | 4/2010 | Petrovic et al. | |
| 2010/0190487 A1* | 7/2010 | Wang | H04W 36/0088 455/423 |
| 2011/0009142 A1* | 1/2011 | Higuchi | H04L 1/20 455/509 |
| 2011/0077020 A1* | 3/2011 | Zangi | H04L 1/0026 455/453 |
| 2011/0188540 A1 | 8/2011 | Ohwatari et al. | |
| 2012/0178484 A1* | 7/2012 | Liu | H04J 11/0053 455/513 |
| 2012/0190375 A1* | 7/2012 | Gu | H04B 7/024 455/450 |
| 2012/0216208 A1* | 8/2012 | Takemura | G08G 1/09623 718/103 |
| 2012/0294162 A1 | 11/2012 | Pajukoski et al. | |
| 2013/0021925 A1 | 1/2013 | Yin et al. | |
| 2013/0044602 A1* | 2/2013 | Xiao | H04B 7/024 370/237 |
| 2014/0010189 A1* | 1/2014 | Tian | H04L 1/1822 370/329 |
| 2014/0293889 A1 | 10/2014 | Mahr et al. | |

OTHER PUBLICATIONS

International Search Report and Written Opinion dated Sep. 25, 2012 for International Application No. PCT/IB2012/052951, International Filing Date: Jun. 11, 2012 consisting of 13-pages.

International Preliminary Report on Patentability dated Dec. 10, 2013, Form/PCT/IB/326, for corresponding International Application No. PCT/IB2012/052951; International Filing Date: Jun. 11, 2012 consisting of 31-pages.

* cited by examiner

METHOD AND SYSTEM FOR WIRELESS COMMUNICATION BASEBAND PROCESSING

CROSS-REFERENCE TO RELATED APPLICATION

This application is a continuation of U.S. patent application Ser. No. 13/217,824, filed Aug. 25, 2011, entitled "METHOD AND SYSTEM FOR WIRELESS COMMUNICATION BASEBAND PROCESSING", the entirety of which is incorporated herein by reference.

FIELD

The present invention relates to wireless communications, and in particular to baseband processing of tasks in a wireless communication system.

BACKGROUND

In current implementations of Long Term Evolution (LTE) wireless communication networks, multiple user equipments (UEs), such as mobile devices, compete for access to multiple radio channels maintained by a base station such as an evolved Node-B (eNB) base station. A scheduler of the base station schedules tasks to be performed by a baseband processor of the base station to service the multiple channels. These tasks must be performed within specific time frames defined by applicable standards. These time frames are necessarily short to enable rapid adaptation to changing channel conditions.

The baseband processor of a base station is bounded in its ability to perform the various tasks that are scheduled due to limitations on processor computational speed and also due to complexity of required tasks. The limitations of the baseband processor give rise to occasions where time expires before the completion of one or more tasks that have been scheduled. When time expires before the completion of a task, the result is a lost opportunity to perform the task, which in turn may result in loss of capacity and unfair distribution of service to users of the UEs.

In response to limitations on processor performance, solutions have been proposed that involve increasing processor computational power. This is a costly solution. Other solutions involve software architectures that improve processor efficiency, but gains in processor efficiency from software architectures still may not be satisfactory.

Therefore, there is a need for improving processing performance in a baseband processor of a base station for wireless communications.

SUMMARY

The present invention advantageously provides a method and system for scheduling tasks at a baseband processor in a wireless communication system. According to one aspect, a method includes assigning a priority to a task associated with a user equipment. The priority is based on at least one parameter affecting a time available for processing the task. Tasks are processed in an order based on their assigned priorities.

According to another aspect, the invention provides a baseband processor that includes a prioritizer and a scheduler. The prioritizer assigns a priority to a task. The priority is based on a comparison of parameters associated with different sets of user equipment. Each parameter affects a time of completion of a task associated with a user equipment. The scheduler schedules tasks for execution based on their assigned priorities.

According to another aspect, the invention provides a method of performing baseband processing in a baseband processor of a wireless communication network. The method includes receiving a first parameter affecting a first processing time of a first process to service a first user equipment in communication with the baseband processor via a first radio transceiver coupled to the baseband processor. The method further includes receiving a second parameter affecting a second processing time of a second process to service a second user equipment in communication with the baseband processor via a second radio transceiver coupled to the baseband processor. The first parameter is compared to the second parameter and performance of the first and second processes are scheduled base on the comparison.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
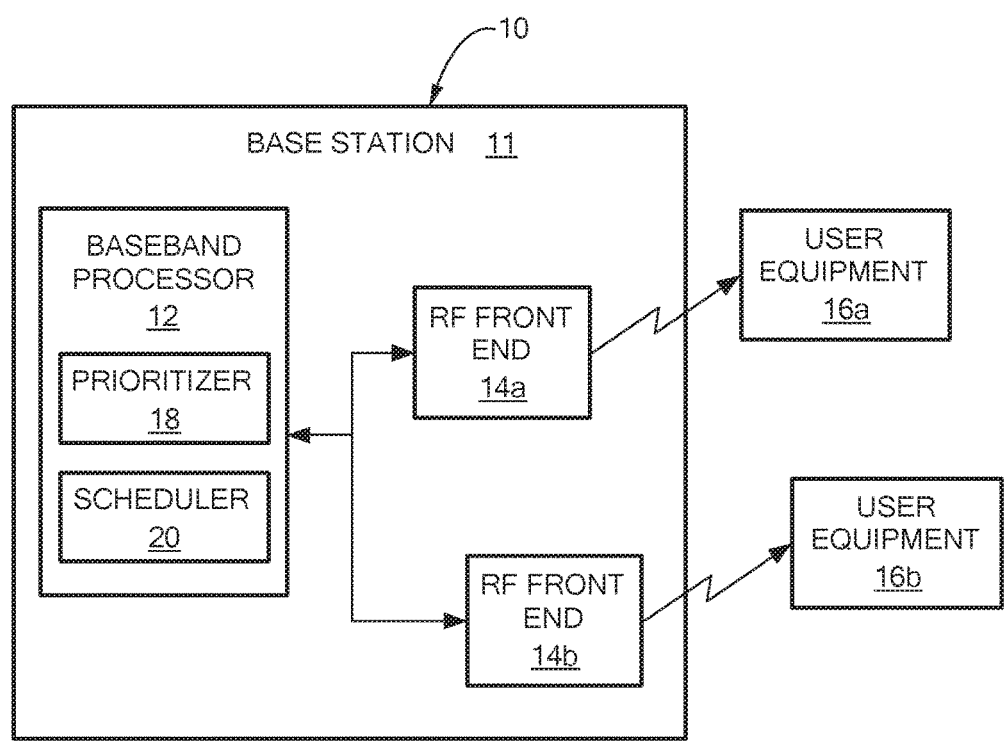
FIG. 1 is a block diagram of an exemplary embodiment of a wireless communication system constructed in accordance with the principles of the invention.

Before describing in detail exemplary embodiments that are in accordance with the present invention, it is noted that the embodiments reside primarily in combinations of apparatus components and processing steps related to baseband processing of tasks in a wireless communication system. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Referring now to the drawing figures, in which like reference designators denote like elements, there is shown in FIG. 1 a block diagram of an exemplary embodiment of a wireless communication system constructed in accordance with the principles of the invention, and denoted generally as "10." The wireless communication system 10 includes a base station 11. Base station 11 includes a baseband processor 12, and a plurality of Radio Frequency (RF) front ends, 14a and 14b, referred to collectively herein as RF front ends 14. The system 10 also includes user equipment 16a and 16b, referred to collectively herein as user equipment 16. The number of RF front ends 14 and user equipment 16 shown in FIG. 1 is by way of example only. Greater or fewer RF front ends and user equipment devices may be implemented. Also, in some embodiments including the embodiment shown in FIG. 1, the RF front ends 14 are housed with the baseband processor 12. The invention is not limited to such. It is contemplated that, in other embodiments, the RF front ends 14 are housed separately and at a distance from the baseband processor 12. Among other functions, the baseband processor 12 performs signal encoding and decoding and modulation and demodulation.

The baseband processor 12 also includes a prioritizer 18 and a scheduler 20. The prioritizer 18 evaluates one or more parameters that affect a time of performing a particular task by the baseband processor. For example, a first parameter may be a distance between the baseband processor and a first RF front end in communication with a first user equipment and a second parameter may be a distance between the baseband processor and a second RF front end in communication with a second user equipment. A higher priority may be assigned to a process associated with the user equipment in communication with the RF front end that is further away from the baseband processor. A higher priority allows for longer processing time to compensate for the time to propagate the longer distance between the RF front end and the baseband processor.

The scheduler 20 schedules a task to be performed by the baseband processor based on the evaluation by the prioritizer 18. For example, the prioritizer 18 may determine which of two RF front ends is further from the baseband processor 12. In response, the scheduler 20 may schedule a task associated with the RF front end further from the baseband processor 12 before scheduling a task associated with the RF front end that is closer to the baseband processor 12.

Figure 2:
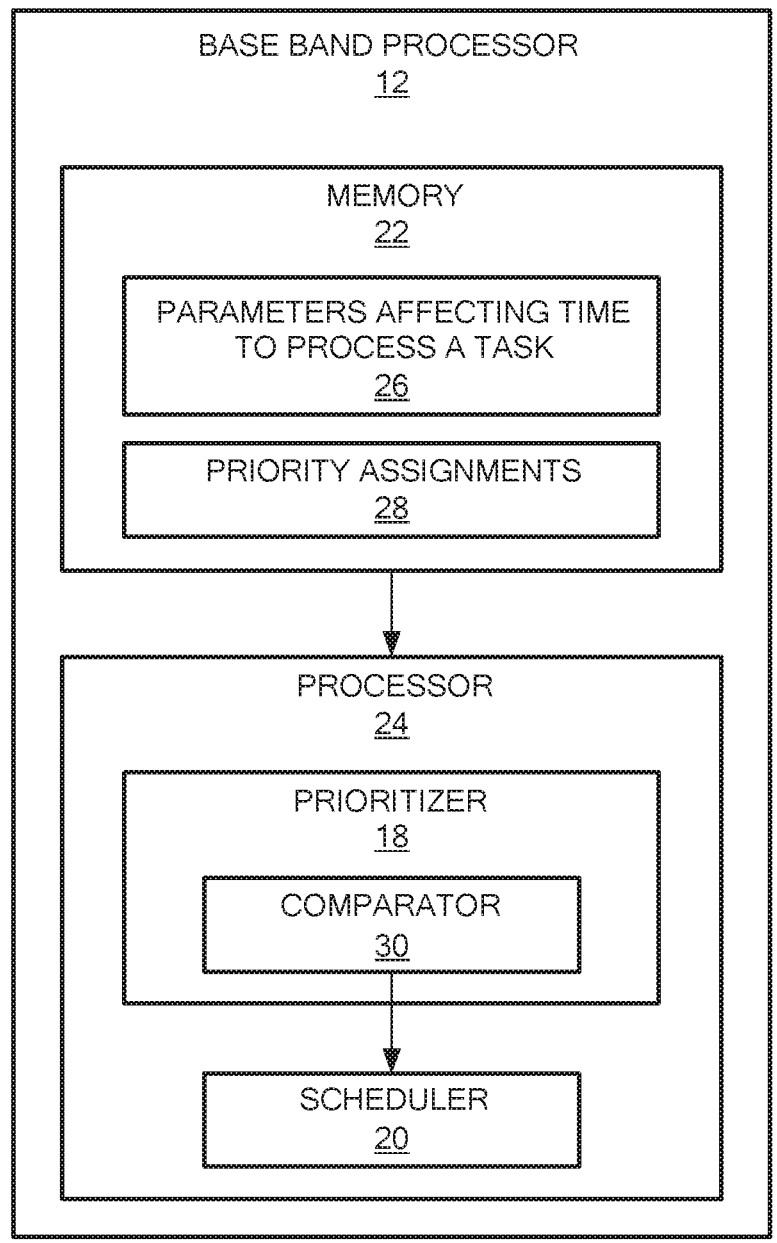
FIG. 2 is a block diagram of an exemplary embodiment of a baseband processor that schedules tasks to be executed.

FIG. 2 is a block diagram of an exemplary embodiment of a baseband processor 12 that schedules tasks to be executed. The baseband processor 12 includes memory 22 and a processor 24. The memory 22 may be Read Only Memory (ROM) and/or Random Access Memory (RAM). The memory 22 stores parameters that affect a time to process a task 26 and a queue of priority assignments 28. The processor 24 may include program counters, instruction and data caches, an instruction decoder unit, instruction buffers, a dispatch unit, arithmetic logic units, floating point execution units, integer register files and floating point register files. The processor 24 executes computer code that may be stored in the memory 22 to perform functions that include parameter prioritization 18 and scheduling 20.

Prioritizer 18 may include determining a value of a parameter that affects a time of performing a task. The prioritizer 18 may evaluate a single parameter or a weighted average of a plurality of parameters. A single parameter or more than one parameter may be associated with a particular task. The parameter evaluation of the prioritizer 18 is performed for each of a plurality of tasks that may be performed sequentially or simultaneously. Such tasks may include routine baseband processing tasks such as encoding and modulation.

Prioritizer 18 prioritizes tasks based upon the evaluation of one or more parameters affecting a time of processing a task. For example, prioritizer 18 may determine that one task should have a higher priority than another task, based on various parameters. For example, the prioritizer 18 may determine a status of a hybrid automatic repeat request (HARQ) process. In a HARQ process, the base station sends an encoded message to a user equipment. The user equipment evaluates the encoded message to determine if the message was received correctly. The user equipment then sends a HARQ message to the base station indicating whether the encoded message was received correctly. If the encoded message was not received correctly, the base station may send a second encoded message. This process may be repeated several times if the encoded message is not properly received. When a first HARQ message is transmitted, the probability of error in receiving and decoding the message is greatest. Conversely, on a third retransmission of the HARQ message, the probability of receiving and decoding the message correctly is greater.

The baseband processor detects whether the HARQ message has been received within a bounded time and indicates an error. According to the LTE standard, one configuration specifies a 4 millisecond (ms) window during which a preset list of protocol stack activities must be completed by the baseband processor 12. As a function of the HARQ retransmission number, the largest loss of throughput occurs for late detection of the first transmission success. Consequently, there is greater urgency to process the response to a HARQ message with a lower HARQ retransmission status. Therefore, when a status of the HARQ process is that more than one HARQ message has been sent to a user equipment 16 in a single ongoing HARQ process, a lower priority is assigned by the prioritizer 18 to the task associated with the user equipment 16 to which the HARQ messages are sent. Conversely, if the HARQ status is that only a first HARQ message has been sent, a higher priority is assigned by the prioritizer 18 to the task associated with the user equipment 16 to which the HARQ message is sent.

As another example, the prioritizer 18 may determine a status of a coordinated multipoint (CoMP) access process associated with a user equipment 16 when the user equipment 16 is in a cell served by the baseband processor 12 or when the user equipment 16 is in a cell other than the cell served by the baseband processor 12. A CoMP access process is a process that utilizes transmission and/or reception at multiple base stations 11 in communication with a user equipment 16. For example, on the downlink, transmissions to the user equipment 16 from multiple base stations 11 may be coordinated to appear as a single transmitter with multiple antennas that are geographically separated. On the uplink, reception from a user equipment 16 may be at multiple base stations that are coordinated to reduce interference and maximize signal to noise ratio.

Thus, at least one parameter evaluated by the prioritizer 18 may be a status of a CoMP access process associated with the user equipment 16 when the user equipment 16 is in a cell served by the baseband processor 12. When the user equipment 16 is in a cell served by the baseband processor 12, a higher number of reception points in the CoMP access process results in a lower priority being assigned to a task upon reception of CoMP information from all neighboring cells participating in the CoMP process. A lower priority is assigned to increase the potential that solicited uplink CoMP inputs are received at the baseband processor 12, before processing of the CoMP signals is scheduled.

Alternatively, at least one parameter evaluated by prioritizer 18 may be a status of CoMP access process associated with the user equipment when the user equipment 16 is in a cell that is different from a cell serviced by the baseband processor 12. When the user equipment 16 is in a cell that is different from the cell serviced by the baseband processor 12, a higher number of reception points in the CoMP process results in a higher priority being assigned to the task.

The prioritizer 18 may include a comparator 30 to compare parameters associated with different user equipments, and may prioritize tasks based on the comparison. For example, the comparator 30 may compare a first distance between the baseband processor and a first RF front end, and a second distance between the baseband processor and a second RF front end, to determine which distance is greater. As another example, the comparator 30 may compare a first HARQ status (which may be a number of retransmission attempts) of a HARQ process between a radio and a first user equipment and a second HARQ status of a HARQ process between the radio and a second user equipment, to determine which HARQ process has the least number of retransmissions. As another example, the comparator 30 may compare a first CoMP status of a first user equipment 16a to a second CoMP status of a second user equipment 16b, to determine which CoMP status has the highest number of reception points.

The scheduler 20 schedules tasks to be performed by the baseband processor 12 based on the priorities assigned to the tasks by the prioritizer 18. For example, the scheduler may schedule a start time for processing a task with a high priority before scheduling a later start time for processing a task with a low priority. The scheduler 20 may write to a memory to form the queue of priority assignments 28.

Thus, one embodiment is a baseband processor 12 in a wireless communication system 10. The baseband processor 12 includes a prioritizer 18 to assign a priority to a task based one or more parameters affecting a time of processing various task to be schedule, and a scheduler 20 schedules a task for execution based on the assigned priority. The prioritizer 18 may include a comparator 30 to compare a first parameter affecting a time for completing a first process to a second parameter affecting a time for completing a second process. The prioritizer 18 may determine which of the first and second processes is assigned a higher priority based on the compared times for completion. The baseband processor 12 includes a memory 22 that stores evaluated parameters 26 and stores a queue of prioritized tasks 28 to be completed.

Figure 3:
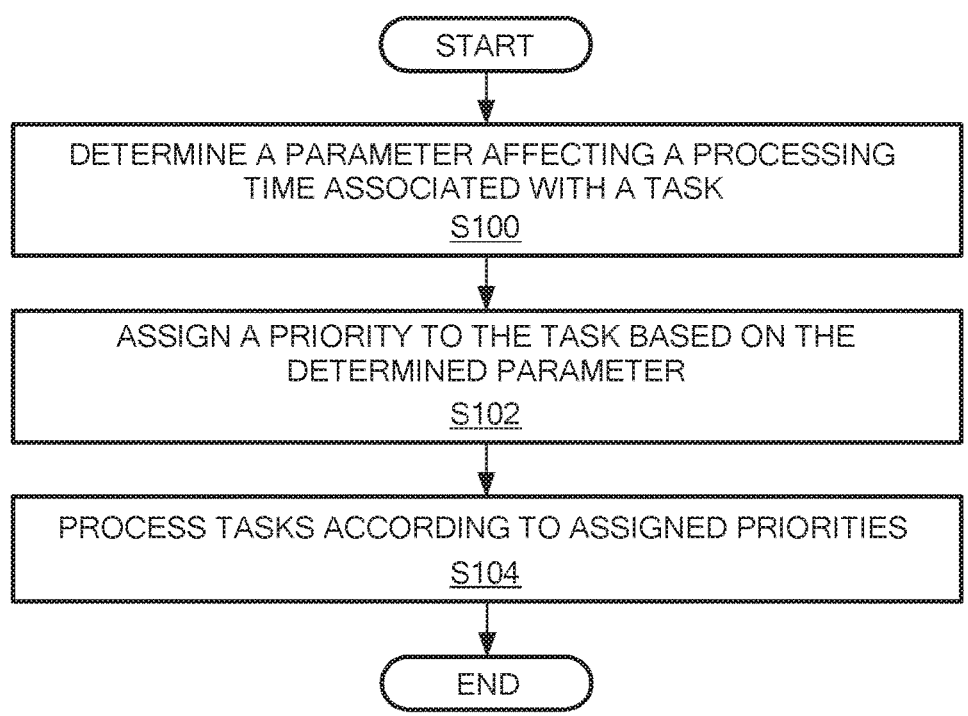
FIG. 3 is a flowchart of an exemplary process for assigning priority of a task based on parameters that affect a processing time associated with the task.

FIG. 3 is a flowchart of an exemplary process for assigning priority of a task based on parameters that affect a processing time associated with the task. Parameters that affect a processing time associated with a task include, but are not limited to, a distance between the baseband processor 12 and an RF front end 14, a status of a HARQ process, a number of participants in a CoMP process, a Multiple Input-Multiple Output (MIMO) state of a user equipment, a type of interference processing performed by the user equipment, and a number of iterations of a decoder process executed by the baseband processor. Referring to FIG. 3, a parameter affecting a processing time associated with a task is determined and evaluated (step S100). A priority is assigned to the task based on the evaluation of the parameter (step S102). Prioritized tasks are processed according to their assigned priorities (step S104), where execution of a higher priority task is started before starting execution of lower priority tasks.

Thus, one embodiment is a method of performing baseband processing in a baseband processor 12 of a radio in a wireless communication network 10. The method includes receiving a first parameter affecting a first processing time of a first process to service a first user equipment 16a in communication with the baseband processor via a first radio transceiver 14a coupled to the baseband processor 12. The method further includes receiving a second parameter affecting a second processing time of a second process to service a second user equipment 16b in communication with the baseband processor 12 via a second radio transceiver 14b coupled to the baseband processor 12. The first parameter and the second parameter are compared, and performance of the first and second processes is scheduled based on the comparison.

Figure 4:
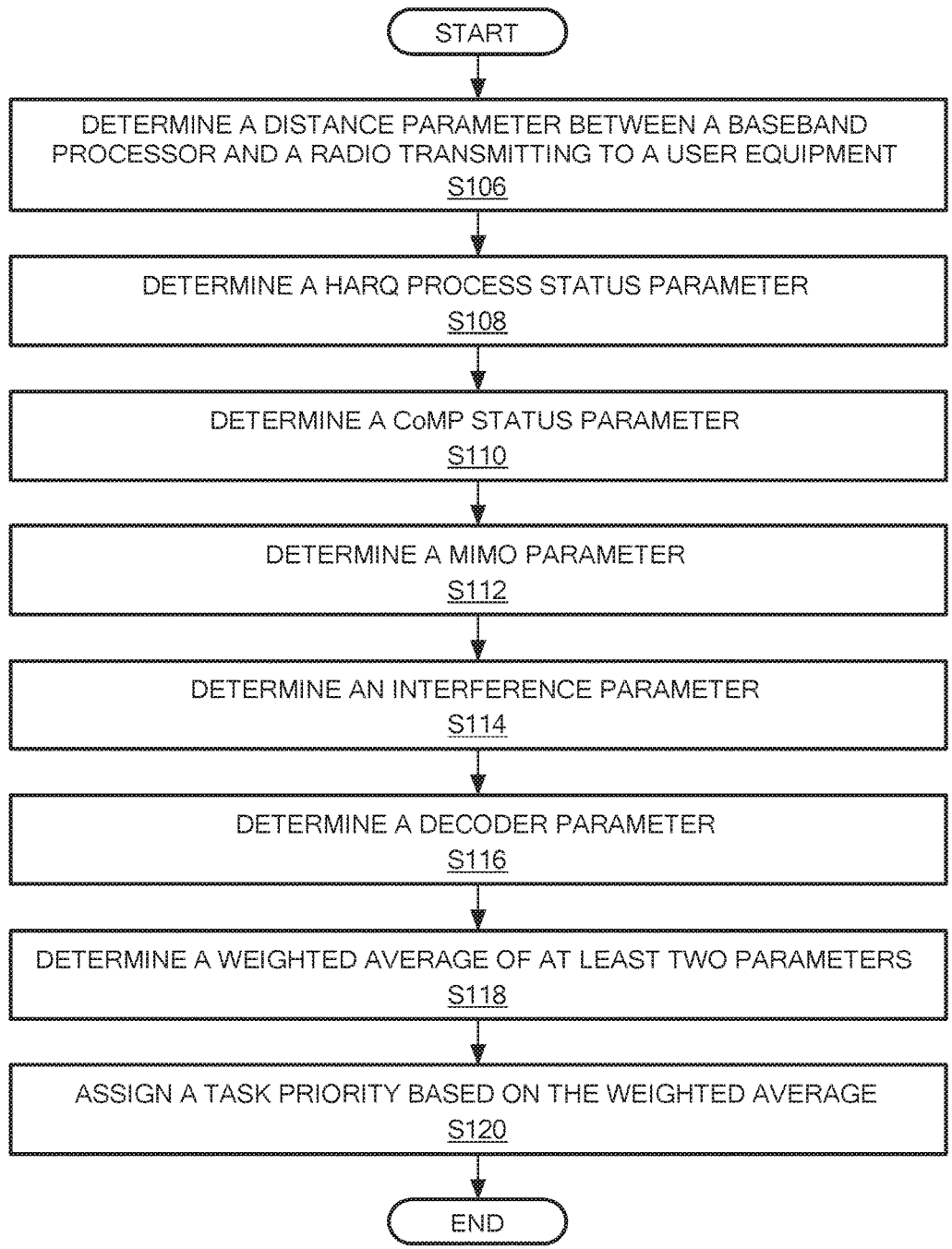
FIG. 4 is a flowchart of an exemplary process for determining a priority of a task based on a weighted average of at least two parameters.

FIG. 4 is a flowchart of an exemplary process for determining a priority of a task based on a weighted average of at least two parameters. A baseband processor determines a distance between the baseband processor and a radio transmitting to a user equipment 16 (step S106). In an alternative embodiment, the distance between the baseband processor 12 and the various RF front ends are predetermined and stored at the baseband processor 12. As noted above, the larger the distance, the higher the priority associated with the task. The baseband processor further determines a status of a HARQ process involving the user equipment (step S108). A higher HARQ retransmission status results in a lower priority associated with the task.

The baseband processor also determines a status of a CoMP process (step S110). When the user equipment for which the task is performed is in the cell being served by the baseband processor, a higher number of reception points in the CoMP process results in a lower priority. When the user equipment for which the task is performed is in a cell that is different from the cell being serviced by the baseband processor, a higher number of reception points in the CoMP process results in a higher priority for the task.

In some embodiments, the baseband processor may also determine a MIMO parameter associated with the user equipment, more multiple inputs and outputs resulting in higher priority (step S112). The baseband processor may also determine an interference parameter indicating a type of interference processing performed by the user equipment, (step S114), a more complex interference process resulting in the assignment of a higher priority. The baseband processor may also determine a decoding parameter indicating a number of decoder iterations performed by the baseband processor (step S116), where the higher the number of decoder iterations, the higher the priority. Other parameters that may be evaluated that affect a processing time associated with a task may be evaluated, including a signal to noise plus interference ratio, a block error rate, and a receiver type of the user equipment. Note that the invention is not limited to the particular order shown in steps S106-S116, and the invention does not require that each and every listed parameter be determined. The steps may be performed in any order, and not every step need be performed. Further, other parameters may be determined in lieu of or in addition to the parameters shown in FIG. 4.

The baseband processor 12 may compute a weighted average of at least two of the various parameters determined in steps S106-S116, (step S118). For example, the baseband processor 12 may compute:

$$\text{Urgency} = k1 \ast (\text{Distance}) - k2 \ast (\text{CoMP status}) - k3 \ast (\text{HARQ status}),$$

where k1, k2, and k3 are determined empirically to minimize lost payload. For instance, k1 and k2 may be based on known average electrical delays. A priority of a task may be assigned based on the weighted average, (step S120). For example, considering only the factors of distance and CoMP status, the following table of urgencies may be constructed:

|  | Near | Far |
|---|---|---|
| CoMP | Less Urgent | More Urgent |
| non-CoMP | More Urgent | Most Urgent |

When a CoMP process is in effect and the RF front end is near to the baseband processor, the task to be performed may be deemed less urgent. When the CoMP process is in effect and the RF front end is far from the baseband processor, the task to be performed may be deemed more urgent. If a CoMP process is not in effect and the RF front end is near the baseband processor the task to be performed may be deemed more urgent, whereas, if the CoMP process is not in effect and the RF front end is far from the baseband processor, the task to be performed may be deemed most urgent.

Thus, one embodiment is a method of scheduling tasks for a baseband processor in a wireless communication system. The method includes evaluating at least one parameter that affects a processing time to perform a task associated with a user equipment. A priority of the task is assigned based on the evaluation, and the task is processed based on the priority. Multiple parameters may be evaluated and a weighted average of the parameters may be computed. The priority assigned may be based on the weighted average. The weights of the weighted average may be derived empirically to reduce lost capacity. Tasks are scheduled according to their assigned priority so that a task with a higher priority is scheduled for execution before a task with a lower priority is scheduled for execution.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, e.g., a router, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of scheduling tasks for a baseband processor in a wireless communication system, the method comprising:
    assigning a priority to a task associated with a user equipment based on at least one parameter affecting a length of time available for processing the task; and
    processing the task based on the priority assigned to the task;
    the at least one parameter comprising:
        a status of a coordinated multipoint (CoMP) access process associated with the user equipment when the user equipment is in a cell served by the baseband processor; wherein, if the at least one parameter is the status of the CoMP access process associated with the user equipment when the user equipment is in a cell served by the baseband processor, a higher number of reception points in the CoMP access process results in a lower priority being assigned to the task in the cell served by the baseband processor upon reception of the CoMP information from all neighboring cells participating in the CoMP process.

2. The method of claim 1, wherein, if when the at least one parameter comprises the distance between the baseband processor and the radio, a longer distance results in a higher priority being assigned to the task.

3. The method of claim 1, wherein, if when the at least one parameter comprises the status of the HARQ process, a lower priority is assigned to a task when the status is that more than one HARQ message has been sent to the user equipment in a single ongoing HARQ process.

4. The method of claim 1, wherein the at least one parameter comprises a status of a CoMP access process associated with the user equipment when the user equipment is in a cell that is different from a cell serviced by the baseband processor.

5. The method of claim 4, wherein a higher number of reception points in the CoMP access process results in a higher priority being assigned to the task.

6. The method of claim 1, wherein the priority assigned to a task is based on a weighted sum of parameters affecting the processing time to service the user equipment associated with the task.

7. The method of claim 1, wherein, the at least one parameter further comprising one of:
    a distance between the baseband processor and a radio transmitting to the user equipment; and
    a status of a hybrid automatic repeat request (HARQ) process.

8. A baseband processor in a wireless communication system, the baseband processor comprising:
    a prioritizer for assigning a priority to a task based on a comparison of parameters associated with plurality of user equipment, said parameters comprising a parameter affecting a time to completion of a task associated with a user equipment,
    a scheduler for scheduling a task for execution based on the priority assigned to the task; wherein the at least one parameter comprises
    a status of a coordinated multipoint (CoMP) access process associated with the user equipment when the user equipment is in a cell served by the baseband processor; wherein, if the at least one parameter is the status of the CoMP access process associated with the user equipment when the user equipment is in a cell served by the baseband processor, a higher number of reception points in the CoMP access process results in a lower priority being assigned to the task in the cell served by the baseband processor upon reception of CoMP information from all neighboring cells participating in the CoMP process.

9. The baseband processor of claim 8, further comprising a memory configured to store a set of the parameters for each of a plurality of processes, each process associated with a corresponding user equipment.

10. The baseband processor of claim 9, wherein a stored parameter affecting a time duration for performing a task is indicative of one of:
- a multiple input multiple output (MIMO) state of the user equipment;
- a type of interference processing performed by the user equipment; and
- a number of iterations of a decoder process executed by the baseband processor.

11. The baseband processor of claim 8, wherein the at least one parameter is a status of a CoMP access process associated with the user equipment when the user equipment is in a cell that is different from a cell serviced by the baseband processor.

12. The method of claim 8, wherein, the at least one parameter further comprises one of:
- a distance between the baseband processor and a radio transmitting to the user equipment; and
- a status of a hybrid automatic repeat request (HARQ) process.

13. The baseband processor of claim 8, wherein the prioritizer further comprises a comparator, the comparator being configured to:
- compare a first parameter affecting a time duration for completing a first process to a second parameter affecting a time duration for completing a second process; and
- determine which of the first and second processes is assigned a higher priority based on the compared parameters.

14. A method of performing baseband processing in a baseband processor of a wireless communication network, the method comprising:
- receiving a first parameter affecting a first processing time of a first process to service a first user equipment in communication with the baseband processor via a first radio transceiver coupled to the baseband processor;
- receiving a second parameter affecting a second processing time of a second process to service a second user equipment in communication with the baseband processor via a second radio transceiver coupled to the baseband processor;
- wherein the first parameter is a status of a coordinated multipoint (CoMP) access process associated with the first user equipment, and the second parameter is a status of a CoMP access process associated with the second user equipment;
- comparing the first parameter to the second parameter; and
- scheduling performance of the first and second processes based on the comparison.

15. The method of claim 14, wherein the first parameter is a status of a hybrid automatic repeat request (HARQ) of the first user equipment, and the second parameter is a status of a HARQ of the second user equipment.

* * * * *